April 29, 1969 SHIGERU MORIUCHI 3,441,733
SCINTILLATION COUNTER FOR IMPROVING MEASUREMENT OF RADIATION DOSE
Filed March 13, 1967

INVENTOR.
SHIGERU MORIUCHI
BY

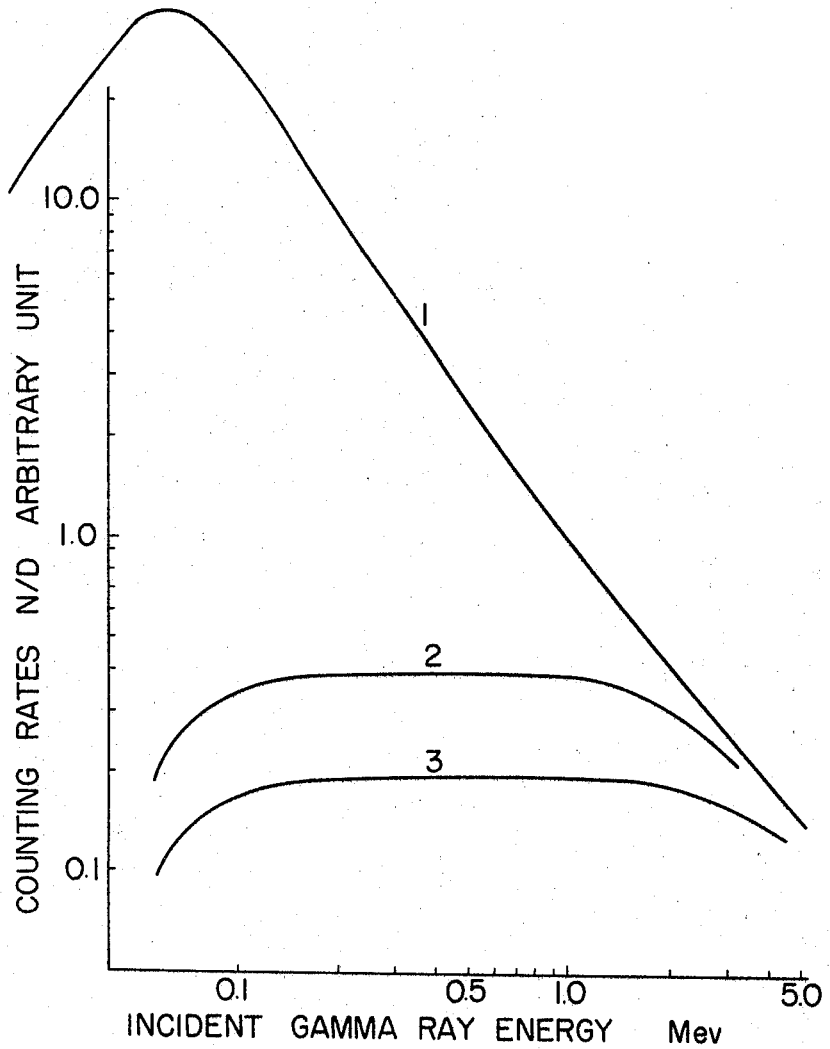

United States Patent Office 3,441,733
Patented Apr. 29, 1969

3,441,733
SCINTILLATION COUNTER FOR IMPROVING MEASUREMENT OF RADIATION DOSE
Shigeru Moriuchi, Ibaraki-ken, Japan, assignor to Japan Atomic Energy Research Institute, Tokyo, Japan
Continuation-in-part of application Ser. No. 406,730, Oct. 27, 1964. This application Mar. 13, 1967, Ser. No. 634,014
Claims priority, application Japan, Nov. 1, 1963, 38/58,480
Int. Cl. G01t 1/20; H01j 39/18
U.S. Cl. 250—71.5                3 Claims

ABSTRACT OF THE DISCLOSURE

A radiation dose measuring device having means for flattening the energy response of a scintillation counter by applying an A.C. bias to the crest discriminator. The A.C. bias is determined by the type of radiation detector and the type of the radiation dose to be measured.

---

This invention relates to the accurate measurement of gamma ray dosage by means of scintillation counters. In particular, it teaches a method of flattening the energy response of the scintillation counter such that the count per unit radiation dose is constant on radiation energy and proportional to the intensity of the dose.

This invention is a continuation-in-part of the original application, Ser. No. 406,730, filed Oct. 27, 1964, and now abandoned.

The measurement of a radiation dose is usually accomplished by means of such devices as ionization chambers, Geiger-Muller tubes or scintillators. The ionization chamber is able to provide a highly accurate measurement because it is free from energy dependence on the radiation dose. However, in order to use this device, special equipment is required for improvement of its sensitivity, e.g. a vibrating reed electrometer. Instruments such as GM surveymeters employing GM tubes or scintillation surveymeters employing scintillators are advantageous in high sensitivity determinations, where a dose as low as $10\mu r./h.$ can be measured. However, the accuracy of these instruments is poor because of their dependence on the radiation energy.

A scintillation counter consists of a scintillation phosphor and a photomultiplier tube coupled together. In general, the three main classes of phosphors include inorganic crystals, organic crystals and organic plastics and solutions. The gamma ray is converted to a light pulse in the phosphor and the light pulse is in turn converted to an electrical pulse by the photomultiplier. A critical part of the measurement depends on whether some of the energy of the incident particle or photon is absorbed by the phosphor. Although scintillation counters are very sensitive, they are still dependent on the efficiency of count of gamma ray energy against a unit amount of the exposure, or absorbed dose. It is generally known, however, that the sensitivity is inversely proportional to the incident gamma energy level. This fact complicates the procedure of determining the radiation dose from a counting rate of the scintillation counter.

In order to solve the above-mentioned limitation, one procedure in usage is to flatten the energy distribution of the pulses themselves. Thus, when employing a pulse discriminator and pulse counter in conjunction with the scintillation counter, the entire circuit is shut down for variable periods of time for each channel of the energy spectrum. The variable time is a function of the counting rate of each channel in the spectrum. This procedure is described in U.S. Patent 3,226,544 to Calvin M. Clark.

Another method is to flatten the energy response of the scintillation counter. The energy response is the response characteristic displaying the relation between the gamma ray energy brought into a scintillation counter and the counting rate of the counter to the radiation dose. Prior art has shown various methods to flatten the energy response of the scintillation counter. These processes generally rely upon means wherein the scintillator is suitably shielded to clamp the high sensitivity in the low energy range of gamma rays. Another method calibrates the measured results by use of an ionization chamber. To attain a sufficiently high accuracy of radiation dose is very difficult, however, because there are limits to these procedures. It thus becomes necessary to combine various complicated procedures. A further method used in prior art to flatten the energy response converts the analog pulses of the scintillator to digital pulses proportional to the pulse height, e.g. pulse dosimeter. These circuits become so complicated that they are generally not used.

This invention contemplates flattening the energy response by using a novel technique. A pulse height discriminator, which normally follows the scintillation counter, is biased by an A.C. modulating wave. The A.C. wave is a function of the type of phosphor used in the detector and the type of radiation. Generally some modified form of a saw tooth wave provides a suitable bias. The response of the circuit then becomes independent of the radiation energy and the count becomes linearly proportional to the intensity of the absorbed energy of the scintillator.

It is therefore an object of this invention to provide a circuit arrangement for flattening the energy response of a scintillation counter which is simple in construction, highly sensitive in operation, and easily operable.

It is a further object to provide an A.C. biased pulse height discriminator as part of the scintillation counter wherein the A.C. bias wave is determined by the type of radiation and the type of detector used.

Another object of the invention is to provide a scintillation counter where the total pulses counted will be proportional to the radiation dose and the total number of counted pulses per unit radiation dose becomes constant on radiation energy.

These and other features, objects and advantages of the invention will, in part, be pointed out with particularity and will, in part, become obvious from the following more detailed description of the invention taken in conjunction with the accompanying drawing which forms an integral part thereof.

In the various figures of the drawing like reference characters designate like parts.

In the drawing:

FIG. 3 is a diagram showing the relation between the counting rate and the incident gamma ray energy of a counter in which anthracene is employed as the scintillator;

Figure 1:
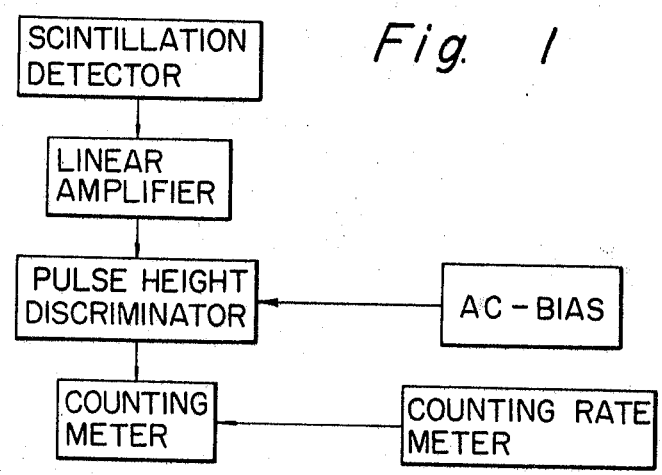
FIG. 1 is a block diagram of the counter circuit for flattening the energy response in accordance with this invention.

With reference to FIG. 1, a scintillation detector is selected from the variety of phosphors available depending on the radiation energy to be measured. An organic scintillator such as anthracene crystal-plastic or an inorganic scintillator such as Na I crystal may be used. The detector is combined with a photomultiplier tube to form a scintillation counter 12. When a radiation dose is exposed to the detector, light pulses are generated. These are converted into electrical pulses by the photomultiplier and amplified by the linear amplifier 14.

The linear amplifier must be stable in operation for amplifying the scintillation pulse from the output of the detector. The pulses must be amplified within the range of the pulse height discriminator.

The output pulse from the amplifier is sent to a pulse height discriminator 16 which is capable of operating within a pulse energy range of 0 up to about 3 Mev maximum energy. The pulse height discriminator is modulated by an A.C. bias from an A.C. modulator 18. The A.C. bias must be of particularly high stability in output level and wave form to avoid considerable variation in the energy response. The output of the discriminator is fed to a pulse counter 20. The pulse rate is counted by counting rate meter 22.

The counter circuit and the counting rate meter may be of any conventional type without any particular requirement.

The pulse height discriminator is a circuit having a preset voltage level to which input pulses are applied. Pulses having a higher level than the pulse height discriminator voltage are permitted to pass while pulses having lower levels than the discriminator voltage cannot pass. By modifying the voltage level of the pulse height discriminator, the energy level of the pulses which are permitted to pass through the pulse height discriminator can be arbitrarily changed. In order to change the discriminator voltage, an A.C. bias is applied to modulate the discriminator voltage level. This is accomplished by superimposing an A.C. current to the D.C. pulse height level, either directly or through capacitors, and to adjust the voltage level of the D.C. bias with the level of the A.C. current.

Figure 7:
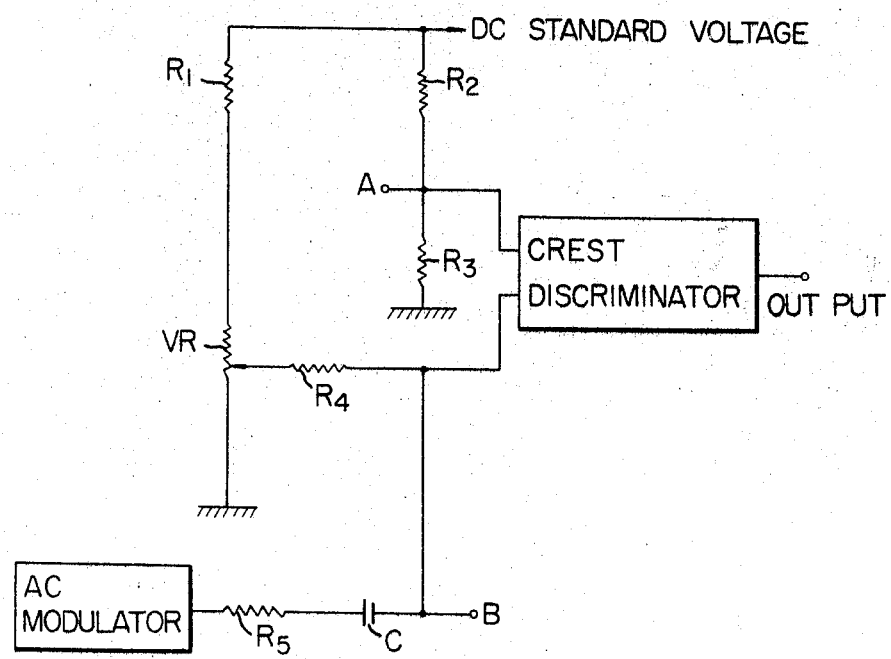
FIG. 7 is a circuit diagram showing the the connection of the A.C. bias to the discriminators.

With reference to FIG. 7, the pulse height discriminator has two inputs. The D.C. standard voltage is applied through a voltage divider $R_2 R_3$ to one terminal of the discriminator and the A.C. bias is applied to the second terminal. The A.C. modulator produces a current which is passed through a capacitor circuit $R_5 C$. Part of the D.C. voltage is regulated and adjusted by means of resistor R, and voltage regulator VR. The A.C. bias is superimposed on the regulated D.C. voltage by means of resistor $R_4$.

The pulse height discriminator is a differential amplifier type and the input pulses are applied to terminals A or B. When the input pulses are applied to terminal A, the voltage of these pulses are superimposed onto the D.C. voltage being applied at this terminal and is compared with the pulsating voltage at terminal B. When the input pulses are applied to terminal B, these pulses are superimposed on the already pulsating voltage at terminal A. Whether a pulse is allowed to pass through the discriminator or not is determined by the voltage at terminals A and B.

The wave form of the A.C. bias can be adjusted to correspond with the necessary level of radiation energy. The wave form is also dependent on the material used for the scintillation detector. A saw tooth or triangular form is usually sufficient for an organic scintillator but for other types of phosphors, it must be selected to assure a flat energy response.

The appropriate wave form for the A.C. bias is determined in the following manner.

Radiation dose D can be calculated from the equation:

$$D = K \int_0^{E_{max}} F(E) G(E) dE \quad (1)$$

where

F(E) is the energy spectrum distribution of pulses to be measured;

G(E) is the load function for obtaining dose D by being applied to energy spectrum distribution of pulses;

$E_{max}$ is the maximum energy of the pulses; and

K is a proportionality constant.

In the instant invention where an organic scintillator is used, the material has an effective atomic number which is near to the effective atomic number of air. Therefore G(E) can be set equal to E and the wave form of the A.C. bias can be selected as a saw tooth wave. However, when G(E) is not equal to E, the wave form of the bias can be determined by resolving the following equation:

$$\frac{G(E)}{G(E_o)} = \frac{t}{t_o} \quad (2)$$

G(E) can be obtained from the equation:

$$D(\xi) = \int_0^{E_o} n(E, \xi) G(E) dE \quad (3)$$

where $D(\xi)$ is the dose received from the incident radiation of a unit intensity and unit radiation;

$n(E, \xi)$ is the pulse height distribution function of detecting pulses; and $$E_{min} \leq \xi \leq E_o \quad (4)$$

where $E_{min}$ is the lower limit of the energy of radiation, the energy response thereof which is to be flattened; and $E_o$ is the upper limit of the energy range of radiation of which the energy response is to be flattened.

Specifically, G(E) can be calculated by means of the pulse height distribution measured under a known dose using a standard source or radiation of various energy levels.

The frequency of the A.C. bias is determined as follows: The ratio at which pulses that have energy levels corresponding to the energy of E can pass through the pulse height discriminator is determined by the ratio $t/t_o$ where $t_o$ is the period of the A.C. bias of the discriminator, and T is the time duration in which pulses having the energy can be permitted to pass through.

Therefore, since $t_o$ is sufficiently longer than the pulse time, $t_o$ can be arbitrarily set.

Ordinarily, as the width is set at about 1 $\mu$sec., $t_o$ can be selected from the value more than some hundreds $\mu$sec. In other words, the frequency can be selected from a value less than 1000 c.p.s.

Now referring to the diagram shown in FIG. 2, an explanation will be made to show how the flattening of the energy response is achieved.

Assume that the incident gamma ray is in the energy range of 0 to $E_o$. When $t = o$, the A.C. bias level $H = 0$. At a given time $t$, the level of the A.C. bias is H and the energy level of the gamma ray is E. The rate R at which the pulse height discriminator passes the pulses from the scintillator will be:

$$R = H/Ho = E/Eo \quad (5)$$

Figure 2:
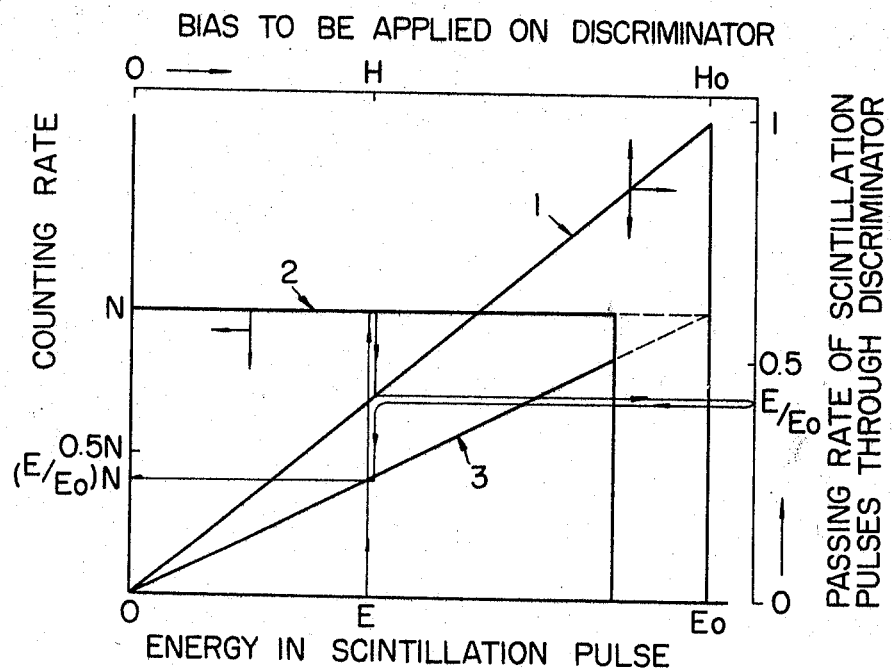
FIG. 2 is a diagram of the various curves used to explain how the energy response is flattened in accordance with the invention.

In FIG. 2, line 1 shows the relation between the A.C. bias, H, applied to the pulse height discriminator and the rate of scintillation pulses passing through the pulse height discriminator. Line 2 shows the distribution of Compton-electrons produced in the scintillator when a gamma ray of certain energy enters into the scintillator. Line 3 depicts the counting rate as the scintillation pulses pass through the pulse height discriminator.

From line 1 it is noted that the bias increases as the energy level of the gamma ray increases. Thus the rate R at which the pulse height discriminator admits the scintillation pulses linearly increases as the energy of the gamma ray increases. The scintillation pulse of energy level E can pass the pulse height discriminator by the amount of bias H applied to the pulse height discriminator. The rate of the passable pulses will be $H/Ho = E/Eo$.

In showing the distribution of scintillation pulses produced by means of line 2, the counting rate is regarded, for simplicity, to be the same, N, for all the energy levels.

Combining all of the above curves, the final counting rate can be determined. At a particular energy level E, the number of scintillation pulses produced are N (line $a$). At the same level the A.C. bias curve, whose value is H (line $b$), permits the pulses to pass at the rate of $E/Eo$ (line $c$). For that same energy level, the number of scintillation pulses which can pass the discriminator will be degraded by the rate $E/Eo$ so that only the scintillation pulses of $$\frac{E}{Eo}N$$

can pass through the discriminator (line $d$). The point $x$ indicates the counting rate for a particular energy level. Thus the line 3 is obtained by weighting the line 2 by energy, whereby a counting rate proportional to the total amount of energy absorbed by the scintillator has been obtained (a similar effect as with the pulse dosimeter). Whatever distribution the line 2 possesses, the counting rate having passed through the pulse height discriminator attains an amount corresponding to it but weighted.

Hence, in a case where a gamma ray is measured by a scintillator made of plastic material, the number of pulses per unit radiation dose entering the discriminator is inversely proportional to the incident gamma energy and the pulse height is nearly proportional to the incident energy. But the number of scintillation pulses passing through the pulse height discriminator to which an A.C. bias of saw tooth wave is applied becomes independent of the incident gamma ray energy and the number of pulses finally produced by the system will be proportional to the intensity of the energy dose which has been absorbed into the scintillator.

FIG. 3 shows energy response curves for 2.5 cm. thick anthracene used as a scintillator crystal. Curve 1 indicates the inversely proportional characteristic of the material to energy levels. Curves 2 and 3 show how the energy response becomes flattened as a result of the method as hereinbefore described. The response becomes independent of the gamma ray energy.

Figure 4:
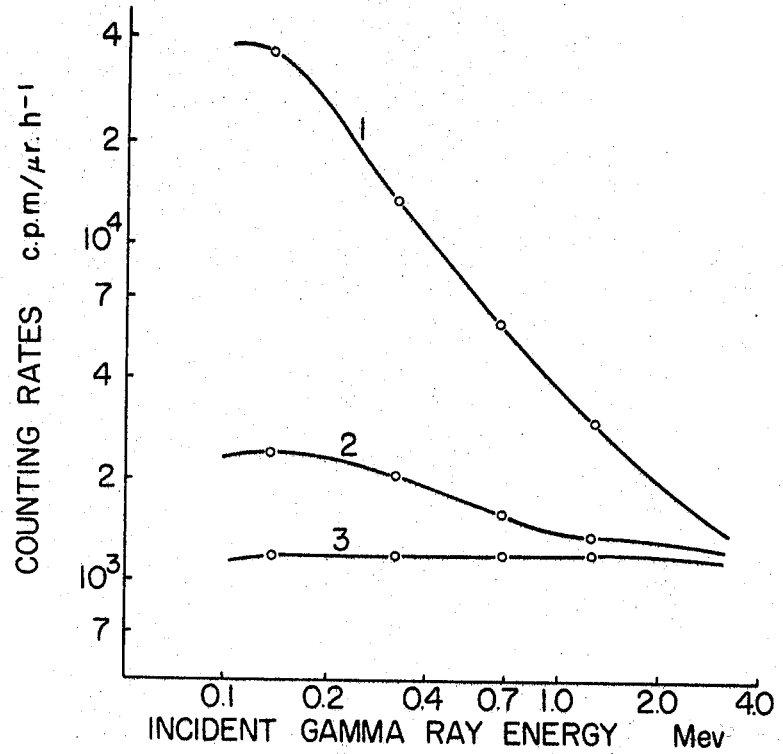
FIG. 4 is a diagram of the energy response of a scintillation counter.
Figure 5:
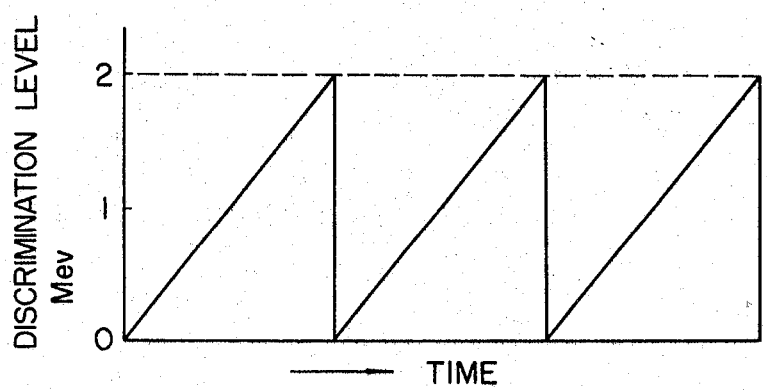
FIG. 5 shows one type of toothed wave which can be employed.
Figure 6:
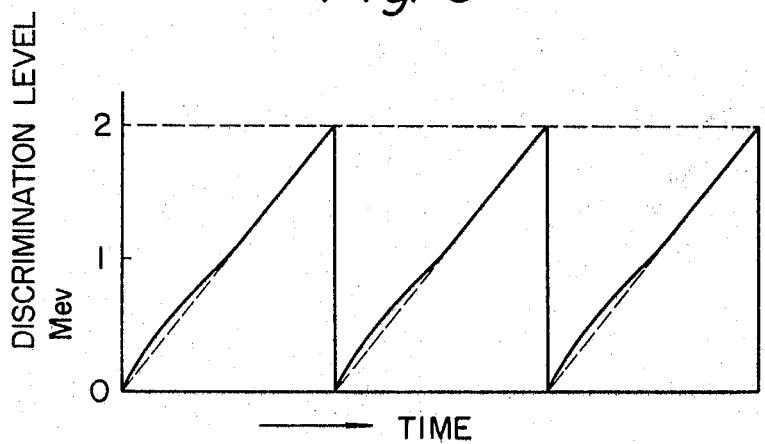
FIG. 6 depicts another wave form that is used to flatten the energy response.

FIG. 4 shows the energy response curves for a scintillation counter employing sodium iodide (inorganic phosphor) having a size of 5″ diameter and 4″ long. Curve 1 indicates the response without applying the method of this invention as hereinbefore described. The sawtooth wave, as depicted in FIG. 5 and hereinbefore described as applicable to organic scintillators, does not completely flatten the energy response in this case, as shown by curve 2. It is necessary to vary the wave form, as shown in FIG. 6, in order to fully achieve a flattened response (curve 3).

Because the appropriate A.C. bias applied to the discriminator makes the system independent of the energy level of the gamma ray, it is possible to use this method in a field in which either the gamma ray energy is unknown or where other radiations are mixed therewith. An accurate estimate of radiation dose can still be made with the described apparatus. Furthermore, the method according to this invention is also applicable to any ionizing radiation besides gamma rays.

What is claimed is:
1. A radiation dose measuring apparatus comprising:
   a scintillator;
   a photomultiplier tube arranged to receive the output of said scintillator;
   an amplifier arranged to receive the output from said photomultiplier tube;
   a pulse height discriminator arranged to receive the output of said amplifier;
   an A.C. function generator supplying an A.C. wave to said discriminator and pulse counting means connected to said pulse height discriminator; wherein said A.C. wave is of constant wave form determined by a function G(E) which is singly determined by the type of radiation to be measured and the type of said scintillator by the formula

$$D = K \int_0^{E_{max}} F(E)G(E)d(E)$$

where
   D is the radiation dose
   F(E) is the energy spectrum distributor of pulses to be measured
   $E_{max}$ is the maximum energy of the pulses
   K is a proportionality constant, and
   G(E) is the load function determining said A.C. waveform;

whereby, the total number of counted pulses is proportional to the radiation dose and the total number of counted pulses per unit radiation dose becomes constant on radiation energy independent of the radiation energy level.

2. An apparatus as in claim 1 wherein said scintillator is composed of a phosphor and said A.C. wave has a period longer than the time duration in which pulses having energy greater than the discriminator level can pass through.

3. An apparatus as in claim 1 wherein said crest discriminator is composed of a differential type amplifier with two inputs, a D.C. voltage applied to a first of said inputs, a voltage regulator connected to said D.C. voltage, producing an adjusted D.C. voltage, and a capacitive circuit, said A.C. wave being superimposed on said adjusted D.C. voltage by means of said capacitive circuit and applied to a second of said inputs.

References Cited
UNITED STATES PATENTS

| | | | |
|---|---|---|---|
| 2,883,548 | 4/1959 | Baker et al. | 250—71.5 |
| 3,226,544 | 12/1965 | Clark | 250—71.5 |

RALPH G. NILSON, *Primary Examiner.*

SAUL ELBAUM, *Assistant Examiner.*

U.S. Cl. X.R.

250—207